United States Patent [19]

Lieding

[11] 4,131,235

[45] Dec. 26, 1978

[54] DUAL-FUNCTION VALVE

[75] Inventor: Calvin A. Lieding, Glendora, Calif.

[73] Assignee: Irrigation Specialties Company, San Gabriel, Calif.

[21] Appl. No.: 737,335

[22] Filed: Nov. 1, 1976

[51] Int. Cl.² .......................... B05B 1/30; F16K 17/04
[52] U.S. Cl. .............................. 239/533.15; 137/512.5; 137/614.21; 239/570
[58] Field of Search ................. 239/63, 68, 207, 262, 239/266, 551, 570–572, 533.1, 533.15; 137/236, 512.5, 513, 614.21, 492.1, 493.6, 493.9, 498

[56] References Cited

U.S. PATENT DOCUMENTS

| 693,133 | 2/1902 | Hennebőhle | 137/614.21 X |
| 1,057,288 | 3/1913 | Short | 137/614.21 X |
| 2,498,482 | 2/1950 | Cadman et al. | 137/512.5 X |
| 3,948,285 | 4/1976 | Flynn | 239/570 X |

Primary Examiner—Evon C. Blunk
Assistant Examiner—Andres Kashnikow
Attorney, Agent, or Firm—Christie, Parker & Hale

[57] ABSTRACT

A dual-function valve assembly for an irrigation system typically having a plurality of sprinkler heads disposed at different elevations downstream from a control valve. A spring-loaded check valve prevents drainage of the sprinkler lines through the lower heads when the control valve is closed. A second valve in the assembly closes to prevent excessive flow if a sprinkler head is damaged or removed. The valve assembly is especially useful in unattended, automatically actuated irrigation systems.

8 Claims, 6 Drawing Figures

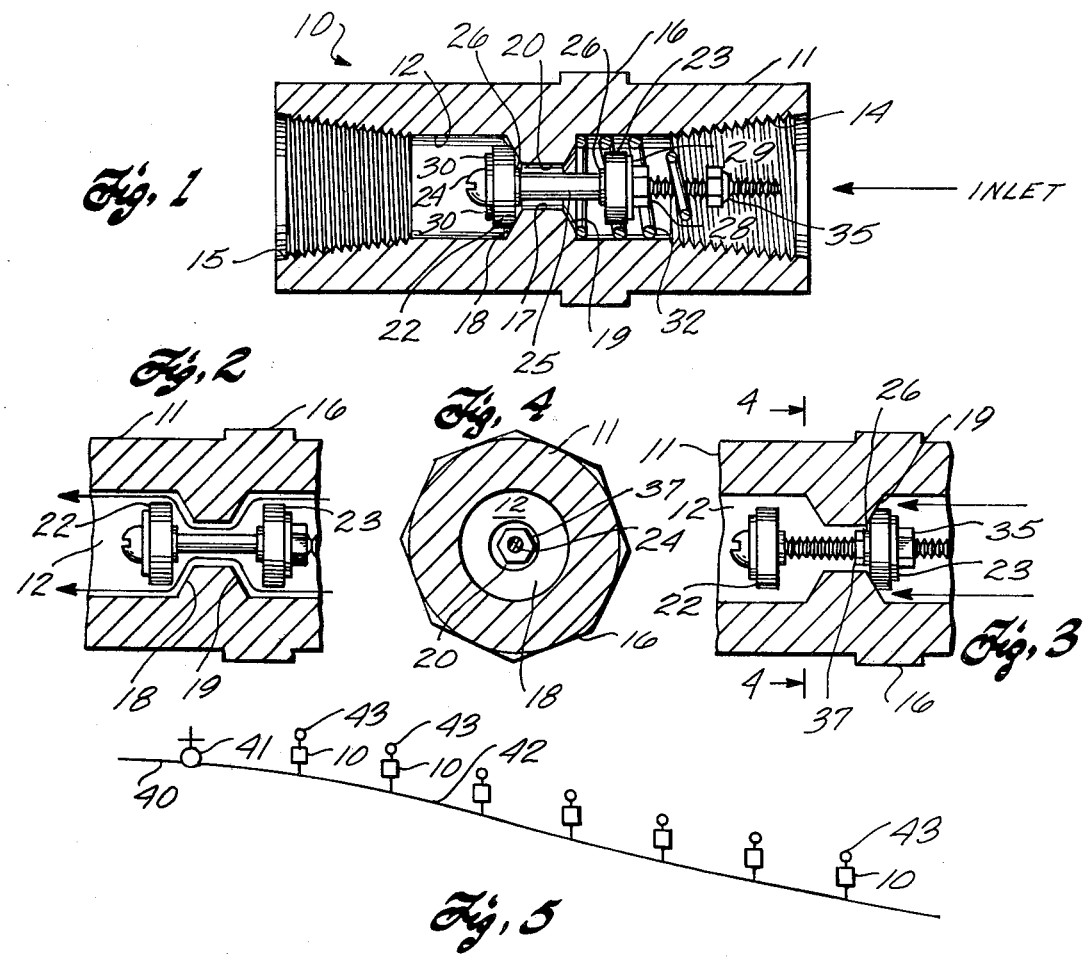
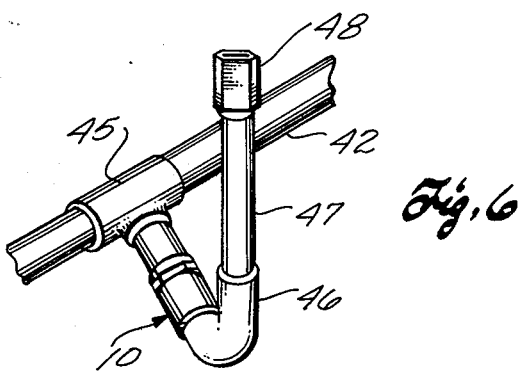

DUAL-FUNCTION VALVE

BACKGROUND OF THE INVENTION

This invention relates to relatively large-scale irrigation systems used to water turf and other planted areas along freeways, and at golf courses, cemetaries, parks, and the like. These areas are preferably watered at night for more effective irrigation, and to avoid interference with normal daytime usage.

Automatic control systems are commercially available for unattended actuation of such irrigation systems on a preselected and adjustable time cycle appropriate to weather conditions and the particular grass or landscaping material being watered. These control systems are helpful in reducing labor expense, and in providing the proper amount of water to each irrigated area during night hours.

Two problems are recognized in irrigation systems of the type just described. The first problem involves line drainage through the lower sprinkler heads when the main control valve is shut off and the heads are installed on sloping terrain. In a typical irrigation system, a substantial amount of water is in the lines downstream of the control valve. This water dribbles out of the lower sprinkler heads by gravity flow, causing flooding of the turf or planted areas adjacent these heads. This flooding may retard or destroy plant growth, and can result in the area around the heads becoming muddy and temporarily unusable. Drainage of the lines can further result in destructive water-hammer conditions if the main supply is subsequently opened to permit high-velocity flow into the empty downstream lines. Soil and clogging debris may also be drawn into higher-level heads as a result of reduced pressure in the lines during drainage flow.

A second and more serious problem arises when a sprinkler head is damaged or removed by vandals, resulting in uncontrolled flow and severe flooding of the adjacent area upon automatic actuation of a watering cycle. Water flow rate through an open-ended pipe is much higher than when the pipe is terminated in a sprinkler head due to the flow impedance of and significant pressure drop across the head. The irrigation system is designed on the basis of known line lengths and sprinkler-head characteristics to deliver a particular amount of water to the sprinkled area for a known water-main pressure and operating time. This controlled water distribution is destroyed when one or more heads are damaged or removed, with serious water loss and flooding being the result.

This problem is particularly acute in irrigation systems for watering sloping planted areas along the sides of freeways and major highways. It is not uncommon for an out-of-control vehicle to leave the road and tear one or more sprinkler heads from the supporting water lines. The sprinkler heads are relatively expensive, and have also frequently been stolen by vandals.

Either damage or removal of a head results in an open-ended line pouring out large amounts of water which floods over the roadway if the failure is not promptly detected and the control valve closed. The potential for vehicle accidents on a suddenly flooded section of roadway is so high that many municipalities require constant surveillance by a workman whenever the irrigation system is operated. This supervision involves additional labor expense at premium rates which usually must be paid for work performed through the night.

The dual-function valve of this invention solves these problems by preventing dribbling flow through the lowermost sprinkler after shutoff of the main control valve, and by sensing and terminating excessive flow caused by a damaged or missing sprinkler head. Drainage-preventing check valves are known for performing the first of these functions, and check valves have previously been used in pneumatic equipment to prevent whipping flexible lines in high-pressure air systems. The new valve described below, however, solves both problems in a simple and economical assembly which is well adapted for use in large-scale irrigation systems.

SUMMARY OF THE INVENTION

Briefly stated, this invention relates to a dual-function valve having a valve body with a passage therethrough, the passage having inlet and outlet ends adapted for connection to upstream and downstream fluid conduits respectively. The body has a means such as an inwardly extending annular portion in the passage to define first and second valve seats.

A closure means is disposed within the passage to be movable between first and second positions, and the closure means has first and second closure surfaces configured to seal against the first and second seats respectively. The first closure surface seals against the first seat with the second closure surface being separated from the second seat in the first closure-means position. The second closure surface seals against the second seat with the first closure surface separated from the first seat when the closure means is in the second position.

A resilient means is disposed between the body and closure means to urge the closure means toward the first position and away from the second position whereby the valve is closed by the first seat and closure surface until upstream fluid pressure is sufficient to move the closure means to a position intermediate and first and second positions for normal fluid flow through the valve. Excessive fluid flow through the valve, as may result with a broken sprinkler head, will drive the closure means to the second position so the valve is closed by the second seat and closure surface to terminate further flow.

Preferably, the closure means has first and second resilient closure members forming the closure surfaces, and a mounting means for supporting the closure members in spaced-apart positions. The mounting means is preferably an elongated member such as a screw, the closure members being slipped over the screw and maintained in spaced-apart positions by a spacer. A nut threaded onto the screw clamps the closure members and spacer in fixed positions. The resilient means is preferably a coil spring having a tapered portion which reduces in diameter to contact a second nut threaded on the elongated member to adjust the compression of the spring.

The dual-function valve is thus effectively a double-acting check valve which terminates flow whenever the fluid flow rate is above or below a predetermined range of normal flow.

BRIEF DESCRIPTION OF THE DRAWINGS

FIG. 1 is a sectional elevation of a dual-function valve assembly according to the invention and shown in a drainage-blocking position;

FIG. 2 is a partial view similar to FIG. 1, but showing the valve assembly in a fully open position;

FIG. 3 is a view similar to FIG. 2, but showing the valve assembly in a position for blocking excessive flow, and with an alternative closure-member positioning arrangement;

FIG. 4 is a section on line 4—4 of FIG. 3;

FIG. 5 is a schematic illustration of an irrigation system; and

FIG. 6 is a perspective view of a typical sprinkler head in combination with the valve assembly.

DESCRIPTION OF THE PREFERRED EMBODIMENT

A dual-function valve assembly 10 according to the invention is shown in FIGS. 1 and 2, and includes a hollow tubular housing 11 having a passage 12 therethrough. Passage 12 defines a threaded inlet end 14 and a threaded outlet end 15, the threads being configured to mate with conventional male pipe threads on plastic or metal water supply and delivery lines (not shown). Preferably, a central portion of the housing is formed with an octagonal outer surface 16 (best seen in FIG. 6) to accommodate a wrench during installation. In a typical configuration, housing 11 is about 3 to 3½ inches long with an outside diameter of about 1⅜ inch, and is internally threaded to receive the pipe being used which typically has a diameter of one-half, three-quarters, or one inch, depending on the gallonage requirements of the system.

The generally cylindrical bore of passage 12 between the tapered threaded sections is interrupted by an annular, inwardly extending portion 17. Beveled side surfaces of portion 17 facing the outlet and inlet ends of the housing respectively, define shoulders forming a first valve seat 18 and a second valve seat 19. A central opening 20 extends through portion 17. Housing 11, including portion 17, is preferably integrally molded from a plastic material such as polyvinyl chloride.

A dual-function closure means for valve assembly 10 is provided by a pair of resilient washer-shaped first and second closure members 22 and 23 which are preferably neoprene synthetic rubber. The closure members are mounted adjacent the head end of a stainless-steel machine screw 24, and are positioned on opposite sides of inwardly extending portion 17 during assembly. The closure members are spaced apart by a tubular spacer 25 and a pair of washers 26 which make a slip fit over the machine screw.

The closure members and tubular spacer are clamped in place by a nut 28 which is tightened against a flat washer 29 bearing against the side of second closure member 23 which faces inlet end 14 of the housing. A similar flat washer 30 is provided between the head of machine screw 24 and the outer face of first closure member 22.

A coil spring 32 provides a resilient means controlling movement of the closure assembly within the housing at different fluid-flow rates. In a typical form, spring 32 has about six turns, the first three of which are of constant diameter to enable free movement of second closure member 23 within this portion of the spring. Both ends of the spring are ground flat, and the inner or large-diameter end of the spring seats against an annular shoulder 34 formed at the periphery of second valve seat 19. The outer end of the spring tapers inwardly to seat against a nut 35 threaded onto machine screw 24.

Preferably, the metal components of valve assembly 10 are made of a corrosion-resistant material such as 300-series stainless steel. Nuts 28 and 35 may be of the self-locking aircraft type, or may be conventional hex nuts which are locked in place by an epoxy cement during assembly.

As shown in FIG. 1, nut 35 is threaded onto screw 24 sufficiently to compress coil spring 32, thereby urging first closure member 22 into sealing engagement with valve seat 18. FIG. 1 thus shows the position of the components in a zero-flow condition when the main irrigation control valve has been shut off. The exact position of nut 35 (and thus the restoring force exerted by spring 32) is selected to enable the valve to open with an upstream head of about 12 to 20 feet, depending upon the installation requirements.

The length of spacer 25 determines the amount of compression of coil spring 32 which is permitted before second closure member 23 comes into sealing engagement with second valve seat 19 to close the valve assembly in an excess-flow condition. In most installations, a simple fixed-length spacer is satisfactory, and the length is chosen to provide excess-flow closure at about seven gallons-per-minute flow in a one-half inch line, about 12½ gpm flow in a three-quarter inch line, and about 25 gpm flow in a one-inch line.

If adjustability of the excess-flow cutoff point is desired, an alternative arrangement as shown in FIG. 3 can be used. In this configuration, spacer 25 is replaced by a nut 37 bearing against washer 26 on the inner face of second closure member 23. With this arrangement, the relative spacing of the two closure members can be varied by adjusting the position of nuts 35 and 37 to provide the desired excess-flow cutoff point.

A typical irrigation system is shown in schematic form in FIG. 5, and includes a water supply line 40 connected to a main control valve 41 which in turn feeds a sprinkler conduit 42 having a plurality of sprinklers 43 coupled thereto. A valve assembly 10 according to the invention is connected between each sprinkler 43 and conduit 42.

A typical installation is shown in greater detail in FIG. 6 where a "T" fitting 45 is provided in sprinkler conduit 42 for each sprinkler head. Valve assembly 10 is horizontally positioned, and threaded onto fitting 45. An elbow 46 is threaded into the downstream end of the valve assembly, and a riser 47 extends upwardly from the elbow to terminate in a sprinkler head 48. This installation arrangement is desirable in that an impact which snaps off the sprinkler head will not interfere with the flow-terminating function of the valve assembly, and the assembly is also positioned underground where it will not be disturbed by vandals.

When the irrigation system is operating at normal flow rates, the components of valve assembly 10 are in the position shown in FIG. 2 (in which coil spring 32 is omitted for clarity). Upstream water pressure in the valve assembly is sufficient to move machine screw 24 and the two closure members carried thereon to the left (as seen in FIG. 2) against the restoring force of spring 32 to unseat the first closure member and permit normal flow through the valve.

When the irrigation cycle is complete and control valve 41 is turned off to terminate further flow, spring 32 forces the first closure member back into engagement with seat 18 to terminate further flow to the associated sprinkler. As explained above, the advantage of this arrangement is that drainage of the upper portions of a sloping line through the downstream sprinkler heads is prevented, avoiding water-hammer problems during the start of the next irrigation cycle, and preventing damaging pooling of water around the lower sprinkler heads in the system.

The excess-flow shutoff condition of the valve assembly is shown in FIG. 3 (spring 32 again being omitted for clarity). This conditions arises when the line downstream of the valve assembly has been broken, or the sprinkler head has been removed or damaged, resulting in a large increase in flow rate through the associated lines. This increased flow rate causes a higher differential pressure across the closure members, causing screw 24 and the associated closure members to move to the left against the restoring force of spring 32 until second closure member 23 is seated against seat 19 to terminate further flow. The valve assembly remains in this condition throughout the remainder of the sprinkling cycle to prevent uncontrolled flow through the broken line or missing sprinkler head. When the main control valve is closed, the valve closure members return to the position shown in FIG. 1 as line pressure bleeds off through the other sprinklers.

The tapered construction of spring 32 enables the spring to act as a coarse screen preventing passage of gravel or other large particulates in the water stream which might otherwise clog the valve or prevent proper seating of the closure members. The tapered construction also provides a self-centering action which maintains the closure members in correct alignment with the respective seats.

The described construction is preferred for the valve assembly as it is simple and economical, and can be rapidly assembled and adjusted. Other constructions are possible, however, and are considered within the scope of the invention. For example, housing 11 may be made in two pieces, each piece having an inwardly extending portion defining one of the valve seats. A single closure member can then be positioned between the inwardly extending portions, and the two housing halves threaded together to capture the closure member between the seats. In this construction, a pair of springs can be used on opposite sides of the closure member to set the two operating points of the valve assembly. Alternatively, the single closure member can be replaced by a pair of unconnected closure members, each of which is actuated by its own spring. It has been found, however, that the preferred form of the valve assembly described in detail above is adequate for all normal applications.

There has been described a dual-function valve assembly for preventing both drainage flow and excess flow through sprinkler lines in an irrigation system. The assembly is made of corrosion-resistant materials, and is easily installed in either new or existing irrigation systems. Use of the assembly promotes efficient management of irrigation water, and prevents potentially hazardous flooding of adjacent areas in the event of damage to or loss of a sprinkler head.

What is claimed is:

1. A normally closed dual-function valve for insertion in an irrigation water line upstream of a sprinkler head, the valve being arranged to block water flow through the line when the flow rate is above or below a normal operating range of flow rates to provide excess-flow and anti-drain protection, the valve comprising:
    a valve body having a passage therethrough with inlet and outlet ends adapted for connection to upstream and downstream water conduits respectively, the body further including first and second valve seats in the passage;
    closure means disposed within the passage to be movable between first and second positions and including first and second closure surfaces configured to seal against the first and second seats respectively, the first closure surface being sealed against the first seat with the second closure surface being separated from the second seat in the first closure-means position, and the second closure surface being sealed against the second seat with the first closure surface separated from the first seat in the second closure-means position; and
    resilient means disposed between the body and closure means and exerting a force to move the closure means to the first position and away from the second position whereby the valve is closed by the first seat and closure surface until upstream water pressure is sufficiently higher than downstream water pressure to move the closure means against the force exerted by the resilient means to a position intermediate the first and second positions for normal water flow through the valve, and whereby excessive water flow through the valve will further overcome the force exerted by the resilient means to drive the closure means to the second position so the valve is closed by the second seat and closure surface.

2. The valve of claim 1, wherein the closure means includes first and second resilient closure members forming the closure surfaces, and a mounting means for supporting the closure members in spaced-apart positions.

3. The valve of claim 2 wherein the valve body has an annular portion extending into the passage with opposite side surfaces forming the valve seats, and wherein the closure members are disposed on opposite sides of the annular portion.

4. The valve of claim 3 wherein the mounting means is an elongated member having a head end and a threaded portion spaced from the head end, one of the closure members being secured adjacent the head end and the other closure member being disposed along the threaded portion, the mounting means further including a spacer fitted over the elongated member and positioned between the closure members, and a nut on the threaded portion to clamp the closure members and spacer in fixed positions.

5. The valve of claim 4 wherein the resilient means is a coil spring having a tapered portion, and including a second nut threaded on the elongated member to bear against an end of the tapered portion and compress the spring between the second nut and the housing.

6. An irrigation system with anti-drain and excess-flow protection, comprising:
    a sprinkler head;
    a supply line adapted for connection to a source of water under pressure; and
    a dual-function valve, including a valve body with a passage therethrough in fluid connection with and between the sprinkler head and supply line, the body defining a pair of valve seats in the passage; flow-controlled closure means disposed in the passage and defining a pair of closure surfaces; and spring means disposed between the valve body and closure means and exerting a force to urge the closure means into a first position placing one of the closure surfaces in sealing engagement with one of the valve seats to close the valve and thereby prevent drainage flow when differential pressure across the valve resulting from upstream water pressure is below a predetermined minimum value, the closure means being movable to a second position placing the other closure surface against the other seat to close the valve and thereby prevent excess flow when differential pressure across the valve reaches a second value substantially higher than the predetermined minimum value, normal flow through the valve occurring when the differential pressure is intermediate the minimum value and second value and neither closure surface is engaged with a respective seat.

7. The system of claim 6 wherein the closure means comprises an elongated member positioned in the passage, a pair of resilient closure members on the elongated member and defining the closure surfaces, and fastening means on the elongated member for securing the closure members in spaced-apart relationship; and wherein the resilient means comprises a coil spring.

8. An irrigation system with anti-drain and excess-flow protection, comprising:
   a sprinkler head;
   a supply line adapted for connection to a source of water under pressure; and
   a dual-function valve, including a valve body with a passage therethrough in fluid connection with and between the sprinkler head and supply line, and a double-acting check valve supported in the housing passage and arranged to close the passage and terminate flow through the valve when fluid flow through the housing toward the sprinkler head is above a predetermined range of desired flow rate, and also to terminate flow through the valve when fluid flow through the housing toward the sprinkler head is below the predetermined range.

* * * * *